US010150073B2

(12) United States Patent
Kikuchi (10) Patent No.: US 10,150,073 B2
(45) Date of Patent: Dec. 11, 2018

(54) AIR CLEANER

(71) Applicant: Wako Filter Technology Co., Ltd., Chiyoda-ku, Tokyo (JP)

(72) Inventor: Naoto Kikuchi, Fukuroi (JP)

(73) Assignee: Wako Filter Technology Co., Ltd. (JP)

( * ) Notice: Subject to any disclaimer, the term of this patent is extended or adjusted under 35 U.S.C. 154(b) by 112 days.

(21) Appl. No.: 15/336,118

(22) Filed: Oct. 27, 2016

(65) Prior Publication Data

US 2017/0151518 A1    Jun. 1, 2017

(30) Foreign Application Priority Data

Nov. 26, 2015  (JP) .................................. 2015-231090

(51) Int. Cl.
*B01D 46/00*    (2006.01)
*F02M 35/02*    (2006.01)

(52) U.S. Cl.
CPC ....... *B01D 46/002* (2013.01); *B01D 46/0005* (2013.01); *F02M 35/0204* (2013.01); *F02M 35/0215* (2013.01); *B01D 2265/05* (2013.01); *B01D 2267/30* (2013.01); *B01D 2279/60* (2013.01)

(58) Field of Classification Search
CPC ............ B01D 46/0001; B01D 46/0002; B01D 46/0005; B01D 46/02; B01D 46/10; B01D 46/0047
USPC .................. 55/385.3, 493, 495, 502, DIG. 5; 123/198 E
See application file for complete search history.

(56) References Cited

U.S. PATENT DOCUMENTS

| | | | | |
|---|---|---|---|---|
| 3,834,134 A | * | 9/1974 | McAllister | B01D 46/02 55/378 |
| 4,929,263 A | * | 5/1990 | Kasugai | B01D 46/0001 123/198 E |
| 4,930,472 A | | 6/1990 | Ozaki | |
| 5,569,311 A | * | 10/1996 | Oda | B01D 46/0002 55/493 |
| 6,375,700 B1 | * | 4/2002 | Jaroszczyk | B01D 46/10 210/493.2 |
| 7,247,183 B2 | * | 7/2007 | Connor | B01D 46/0002 55/495 |
| 8,444,733 B2 | * | 5/2013 | Thienel | B01D 46/0005 55/385.3 |
| 2008/0110146 A1 | * | 5/2008 | Germain | B01D 46/0005 55/385.3 |
| 2009/0126324 A1 | * | 5/2009 | Smith | B01D 46/0002 55/385.3 |

(Continued)

FOREIGN PATENT DOCUMENTS

JP    S505979 A    1/1975
JP    S53122779 U    9/1978

(Continued)

*Primary Examiner* — Duane Smith
*Assistant Examiner* — Minh Chau T Pham
(74) *Attorney, Agent, or Firm* — St Onge Steward Johnston and Reens LLC (57) ABSTRACT

By joining together first case and second case, a notch in the first case and a notch in the second case are unified and an intake opening for air is formed. The ratio of the depth of the cases to the height of the intake opening is in the range 10:1 to 20:1.

4 Claims, 7 Drawing Sheets

(56) References Cited

U.S. PATENT DOCUMENTS

| | | | | |
|---|---|---|---|---|
| 2011/0308214 A1* | 12/2011 | Jessberger | ......... | B01D 46/0005 55/502 |
| 2012/0047856 A1* | 3/2012 | Khami | ............... | B01D 46/0002 55/385.3 |
| 2012/0073252 A1* | 3/2012 | Lee | .................... | F02M 35/0203 55/385.3 |
| 2012/0192535 A1* | 8/2012 | Schrewe | ............ | B01D 46/0005 55/385.3 |

FOREIGN PATENT DOCUMENTS

| | | |
|---|---|---|
| JP | H01173460 U | 12/1989 |
| JP | H02107588 U | 8/1990 |
| JP | H04176315 A | 6/1992 |
| JP | 2000033244 A | 2/2000 |
| JP | 2001280207 A | 10/2001 |
| JP | 2007113569 A | 5/2007 |
| JP | 2015121165 A | 7/2015 |

\* cited by examiner

|   | DEPTH: L (mm) | INTAKE OPENING HEIGHT: M(mm) | FILTER RESISTANCE (Pa) |
|---|---|---|---|
| A | 376.6 | 34.0 | 119 |
| B | 376.6 | 19.0 | 203 |
| C | 376.6 | 8.0 | 645 |

|   | INTAKE OPENING WIDTH: N (mm) | INTAKE OPENING HEIGHT: M (mm) | PITCH (m/m) | FILTER RESISTANCE (Pa) |
|---|---|---|---|---|
| D | 367.5 | 19.0 | 4.5 | 203 |
| E | 285.9 | 24.4 | 3.5 | 229 |
| F | 204.0 | 34.2 | 2.5 | 269 |

AIR CLEANER

CROSS-REFERENCE TO RELATED APPLICATION

This application claims the benefit of Japanese Patent Application No. 2015-231090, filed on Nov. 26, 2015, the entire disclosure of which is incorporated by reference herein.

FIELD OF THE INVENTION

This application relates generally to an air cleaner.

BACKGROUND OF THE INVENTION

Conventionally, an air cleaner has been used in a vehicle and/or the like in order to remove dust and/or the like mixed with air supplied to the vehicle's engine (for example, see Unexamined Japanese Patent Application Kokai Publication No. 2015-121165). This kind of air cleaner is such that a path for air is formed from an opening to a filter. Air that has entered from the opening flows to the outside after dust and/or the like has been removed by the filter.

In the above-described air cleaner, a structure suitable for cleaning air is preferable. More specifically, a structure that is compact yet is such that resistance (airflow resistance) when air is passing through the filter does not become large is preferable.

In consideration of the foregoing, an objective of the present disclosure is to provide a structure that is compact and suitable for reducing airflow resistance.

SUMMARY OF THE INVENTION

In order to achieve the above objective, an air cleaner according to a first aspect of the present disclosure is an air cleaner comprising a first box-shaped member and a second box-shaped member, and a joining member for joining the first box-shaped member and the second-box shaped member, wherein:

the first box-shaped member comprises:
a rectangular first filter;
four first flanks joined to and rising over outer edges of the first filter; and
a first notch formed in one first flank, out of the first flanks, and in a side facing the side to which the first filter is joined; and
the second box-shaped member comprises:
a rectangular second filter;
four second flanks joined to and rising over outer edges of the second filter; and
a second notch formed in one second flank, out of the second flanks, and in a side facing the side to which the second filter is joined; and
the first box-shaped member and the second box-shaped member are joined such that the first notch and the second notch face each other.

The present disclosure may be such that in two first flanks joined to the first flank in which the first notch is formed, out of the first flanks, the side joined to the first flank in which the first notch is formed is longer than the side opposite the side joined to the first flank in which the first notch is formed; and in two second flanks joined to the second flank in which the second notch is formed, out of the second flanks, the side joined to the second flank in which the second notch is formed is longer than the side opposite the side joined to the second flank in which the second notch is formed.

The present disclosure may be such that by the first box-shaped member and the second box-shaped member being joined together, the ratio of the height of an intake opening formed by the first notch and the second notch to the length from a surface in which the intake opening is formed in the first box-shaped member and the second box-shaped member to a surface opposite the surface in which the intake opening is formed is in the range of 1:10 to 1:20.

The present disclosure may be such that the first filter and the second filter have a saw-toothed or wavelike surface; and the pitch of the saw-toothed or wavelike surface is larger the smaller the height of the intake opening is.

With the present disclosure, a structure that is compact and suitable for reducing airflow resistance is possible.

BRIEF DESCRIPTION OF THE DRAWINGS

A more complete understanding of this application can be obtained when the following detailed description is considered in conjunction with the following drawings, in which.

DETAILED DESCRIPTION OF THE INVENTION

Below, an exemplary embodiment of the present disclosure is described in detail with reference to the drawings.

Figure 1:
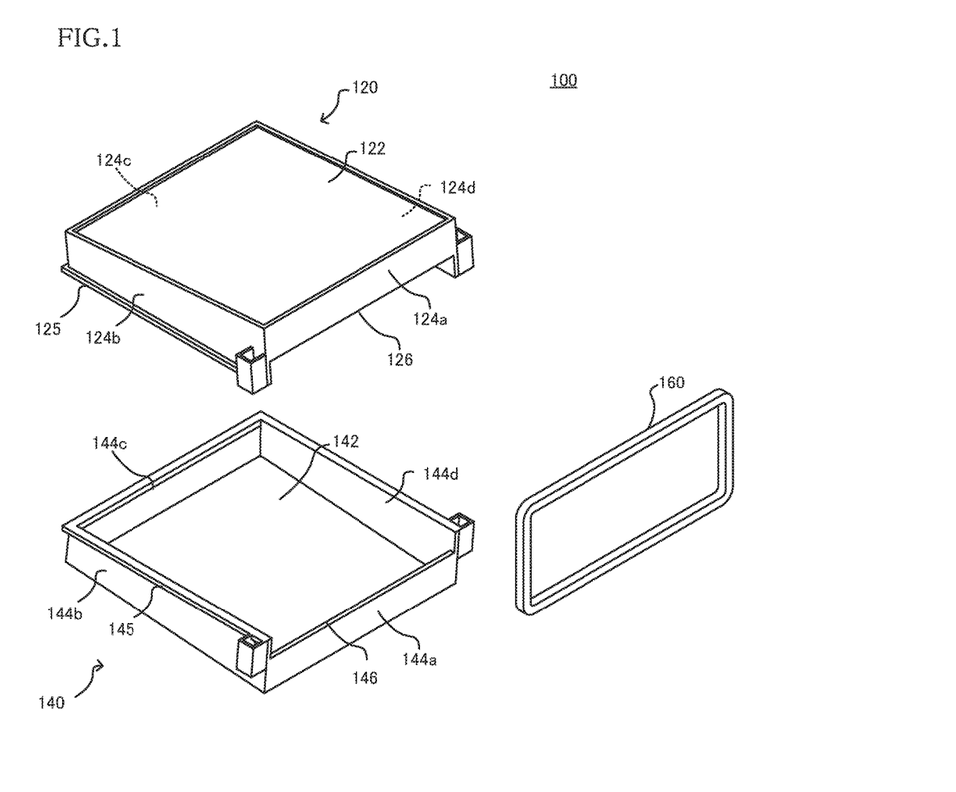
FIG. 1 is an external oblique view of components comprising an air cleaner according to an exemplary embodiment.
Figure 2:
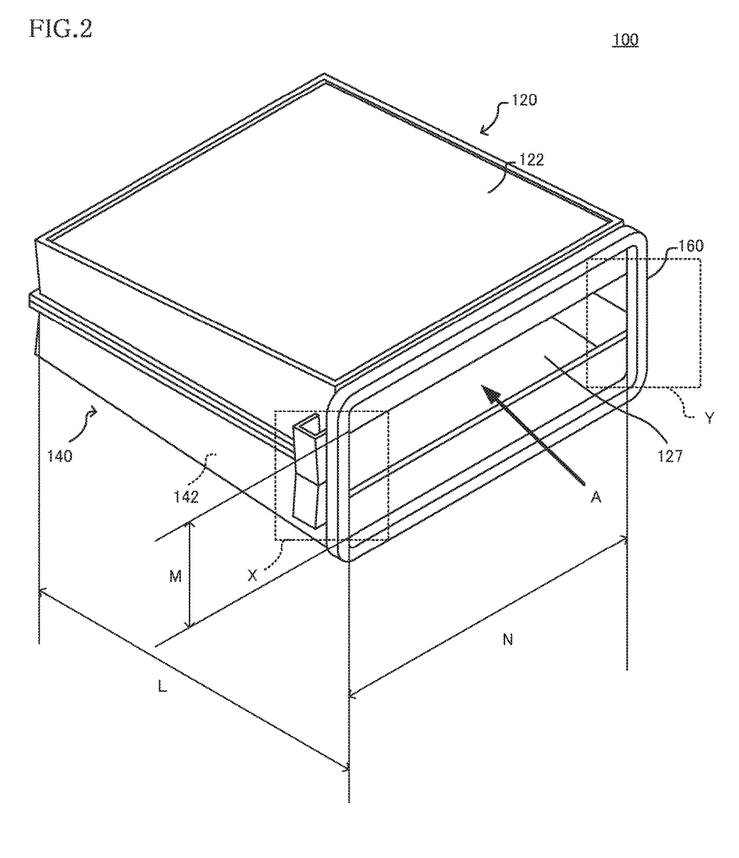
FIG. 2 is an external oblique view of the air cleaner according to the exemplary embodiment.

FIG. 1 is an external oblique view of components comprising an air cleaner according to the exemplary embodiment, and FIG. 2 is an external oblique view of the air cleaner according to the exemplary embodiment. As shown in FIG. 1 and FIG. 2, an air cleaner 100 includes a case 120 as a first box-shaped member, a case 140 as a second box-shaped member and a gasket 160 as a joining member.

The case 120 includes a filter 122; flanks 124a, 124b, 124c and 124d as first flanks; and a squared-U-shaped frame 125.

The filter 122 is rectangular and sheet-shaped, and is made of a sheet and/or the like of glass fibers, foam materials such as sponge and/or the like, nonwoven cloth, paper such as filter paper and/or the like and granular activated charcoal woven together. The surface of the filter 122 is formed in a saw-toothed or wavelike shape of a prescribed pitch.

The flanks 124a, 124b, 124c and 124d as first flanks are made of resin and/or the like. One side of the flanks 124a, 124b, 124c and 124d is joined to the four sides of the filter 122 in this order. In addition, of the two sides in the flank 124a that connect to both ends of the side joining the filter 122, one is joined to the flank 124b and the other is joined to the flank 124d. Of the two sides in the flank 124b that connect to both ends of the side joining the filter 122, one is joined to the flank 124a and the other is joined to the flank 124c. Of the two sides in the flank 124c that connect to both ends of the side joining the filter 122, one is joined to the flank 124b and the other is joined to the flank 124d. Of the two sides in the flank 124d that connect to both ends of the side joining the filter 122, one is joined to the flank 124a and the other is joined to the flank 124c. As described above, a box-shaped member is formed by the filter 122 and the flanks 124a, 124b, 124c and 124d being joined together.

In the flank 124a, on the side of the side opposite the side connected with the filter 122, a notch 126 is formed as a first notch. In addition, the squared-U-shaped frame 125 is joined to the sides of the flanks 124b, 124c and 124d, opposite the sides joined to the filter 122. The squared-U-shaped frame 125, like the flank 124a, is made of resin and/or the like. In addition, the respective sides of the flanks 124b and 124d joining the flank 124a are longer than the sides joining the flank 124c.

The case 140 has the same shape as the case 120. The case 140 includes a filter 142; flanks 144a, 144b, 144c and 144d as second flanks; and a squared-U-shaped frame 145.

The filter 142, like the filter 122, is rectangular and sheet-shaped, and is made of a sheet and/or the like of glass fibers, foam materials such as sponge and/or the like, nonwoven cloth, paper such as filter paper and/or the like and granular activated charcoal woven together. The surface of the filter 142 is formed in a saw-toothed or wavelike shape of a prescribed pitch.

The flanks 144a, 144b, 144c and 144d as second flanks are made of resin and/or the like. One side of the flanks 144a, 144b, 144c and 144d is joined to the four sides of the filter 142 in this order. In addition, of the two sides in the flank 144a that connect to both ends of the side joining the filter 142, one is joined to the flank 144b and the other is joined to the flank 144d. Of the two sides in the flank 144b that connect to both ends of the side joining the filter 142, one is joined to the flank 144a and the other is joined to the flank 144c. Of the two sides in the flank 144c that connect to both ends of the side joining the filter 142, one is joined to the flank 144b and the other is joined to the flank 144d. Of the two sides in the flank 144d that connect to both ends of the side joining the filter 142, one is joined to the flank 144a and the other is joined to the flank 144c. As described above, a box-shaped member is formed by the filter 142 and the flanks 144a, 144b, 144c and 144d being joined together.

In the flank 144a, on the side of the side opposite the side connected with the filter 142, a notch 146 is formed as a second notch. In addition, the squared-U-shaped frame 145 is joined to the sides of the flanks 144b, 144c and 144d opposite the sides joined to the filter 142. The squared-U-shaped frame 145, like the flank 144a, is made of resin and/or the like. In addition, the respective sides of the flanks 144b and 144d joining the flank 144a are longer than the sides joining the flank 144c.

In the process of manufacturing the air cleaner 100, the case 120 is positioned so that the filter 122 becomes the top surface, and the case 140 is positioned so that the filter 142 becomes the bottom surface. In addition, the case 120 and the case 140 are positioned so that the notch 126 in the case 120 and the notch 146 in the case 140 are opposite each other. The length of the case 120 and the case 140 in the direction of depth is L.

Furthermore, the squared-U-shaped frame 125 in the case 120 and the squared-U-shaped frame 145 in the case 140 touch each other, and the case 120 and the case 140 are joined together through a method such as vibration welding and/or the like. Through this, the notch 126 in the case 120 and the notch 146 in the case 140 are unified, so that an intake opening 127 for air is formed as shown in FIG. 2. The intake opening 127 measures M in a direction (height) orthogonal to the side on the intake opening 127 side, out of the four sides in the filters 122 and 142, and measures N in a direction (width) that is horizontal.

Following this, the gasket 160 is joined to the flank 124a in the case 120 and the flank 144a in the case 140 so as to surround the intake opening 127. The gasket 160 is a ring-shaped member made for example of rubber.

When air is cleaned by the air cleaner 100, as shown in FIG. 2 the air passes through the intake opening 127 from the direction of A and is taken into the air cleaner 100. The air that has been taken to the inside of the air cleaner 100 has dust and/or the like removed therefrom by the upper and lower filters 122 and 142. Furthermore, the air from which dust and/or the like has been removed flows to the outside of the air cleaner 100 from the top surface of the filter 122 and the bottom surface of the filter 142.

Figure 3:
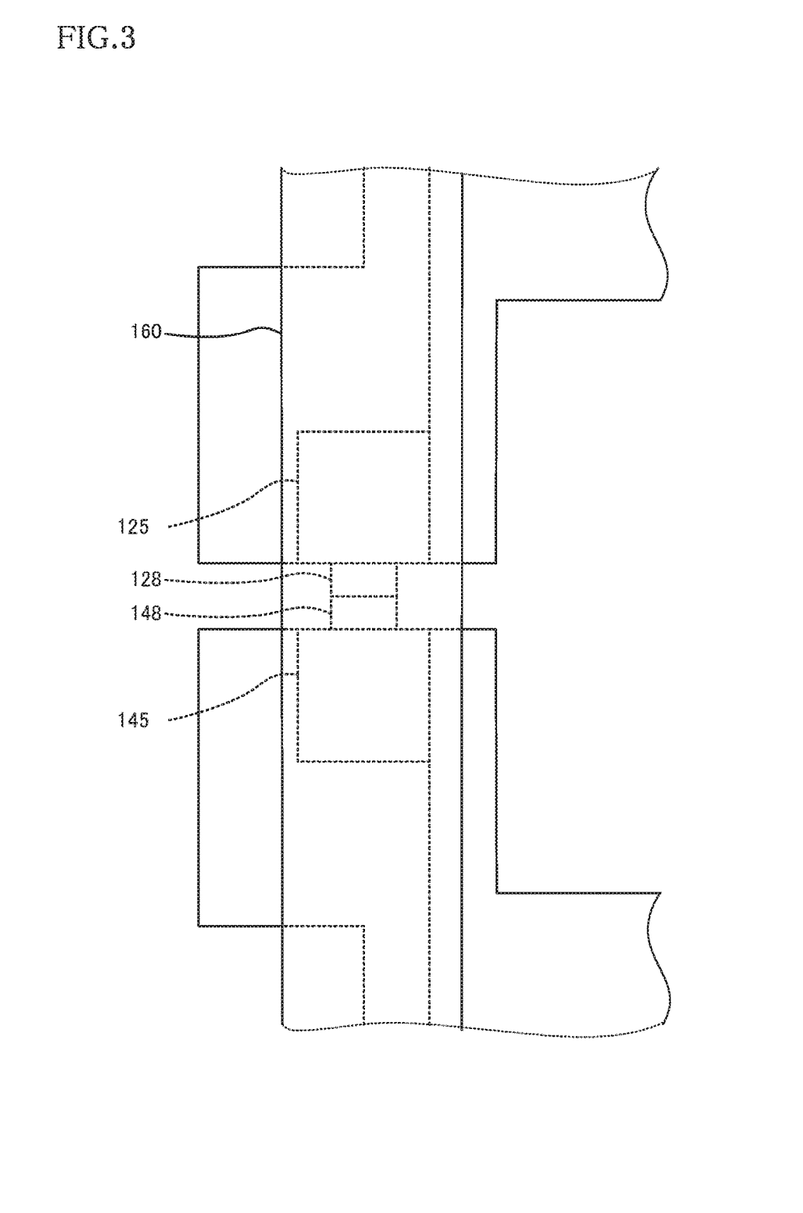
FIG. 3 is an enlarged view of a joint location in the air cleaner according to the exemplary embodiment.

FIG. 3 is an enlarged view of a joint location between the case 120 and the case 140 in the air cleaner 100 according to the exemplary embodiment. FIG. 3 is an enlarged view of an X section as seen from the A direction in FIG. 2.

As shown in FIG. 3, a protuberance 128 is formed as a first protrusion in the bottom surface of the squared-U-shaped frame 125 in the case 120. On the other hand, a protuberance 148 is formed as a second protrusion in the top surface of the squared-U-shaped frame 145 in the case 140. When the case 120 and the case 140 are joined together, the protuberance 128 and the protuberance 148 touch each other and are fastened together through a method such as vibration welding and/or the like.

FIG. 3 shows the X section in FIG. 2, but similarly, in the Y section in FIG. 2 also, the protuberance 128 is formed as a first protrusion on the bottom surface of the squared-U-shaped frame 125 in the case 120, the protuberance 148 is formed as a second protrusion in the top surface of the squared-U-shaped frame 145 in the case 140, and furthermore, when the case 120 and the case 140 are jointed together, the protuberance 128 and the protuberance 148 touch each other and are fastened together through a method such as vibration welding and/or the like.

Furthermore, the gasket 160 is positioned at a position in contact with the end of the protuberance 128 and the end of the protuberance 148 and is adhered to the end of the protuberance 128 and the end of the protuberance 148, and is also joined together with the flank 124a in the case 120 and the flank 144a in the case 140.

Figure 4:
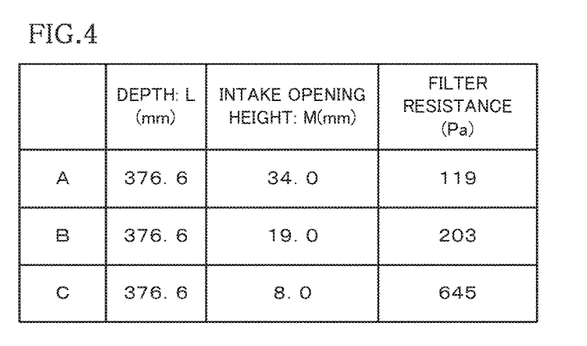
FIG. 4 is a diagram showing one example of the correspondence between size and filter resistance in the air cleaner according to the exemplary embodiment.
Figure 5:
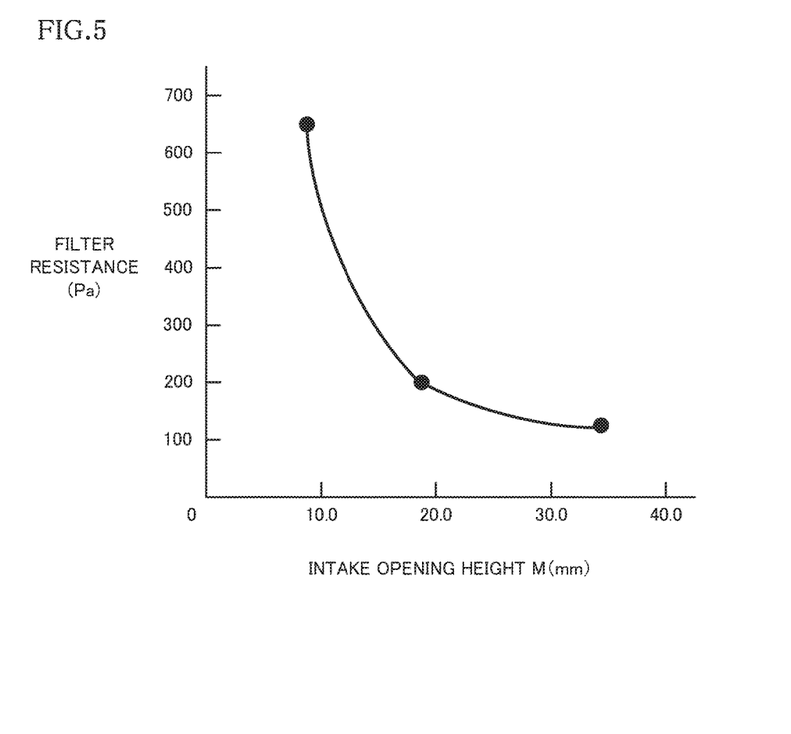
FIG. 5 is a diagram showing one example of the correspondence between intake opening height and filter resistance in the exemplary embodiment.

FIG. 4 is a diagram showing one example of the correspondence between the size of the air cleaner 100 and air resistance (filter resistance) in the filters 122 and 142 according to the exemplary embodiment. In addition, FIG. 5 is a diagram showing one example of the correspondence between the height M of the intake opening 127 and resistance in the filters 122 and 142 in the exemplary embodiment. The inventor set various sizes for the height M of the intake opening 127, caused air to be taken in from the intake opening 127 and analyzed the filter resistance of the filters 122 and 142. In this analysis, the volume of air taken in from the intake opening 127 was taken to be 7.3 (m3/min).

Through this analysis, as shown in FIG. 4 and FIG. 5, in a model A (the depth L of the cases 120 and 140 being 376.6 (mm), and the height M of the intake opening 127 being 34.0 (mm)), the filter resistance was 119 (Pa). In addition, in a model B (the depth L of the cases 120 and 140 being 376.6 (mm), and the height M of the intake opening 127 being 19.0 (mm)), the filter resistance was 203 (Pa). In addition, in a model C (the depth L of the cases 120 and 140 being 376.6 (mm), and the height M of the intake opening 127 being 8.0 (mm)), the filter resistance was 645 (Pa). From this analysis, the fact that filter resistance increased suddenly in model C compared with model A and model B became clear.

From the results of the above-described analysis, the filter resistance of the filters 122 and 142 is in a suitable range with models A and B, that is to say with the ratio of the depth L of the cases 120 and 140 to the height M of the intake opening 127 in the range of 10:1 to 20:1.

Figure 6:
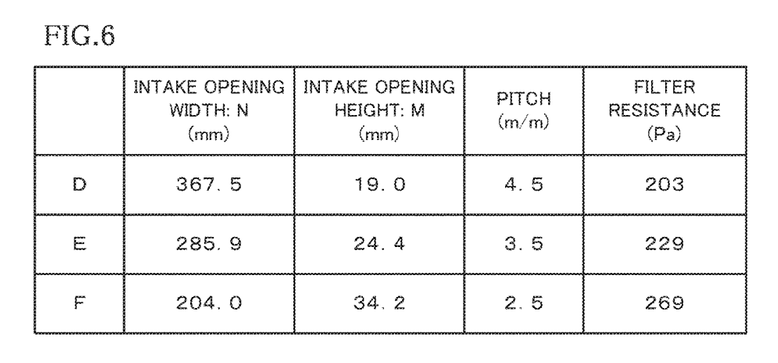
FIG. 6 is a diagram showing one example of the correspondence between intake opening size, the saw-toothed or wavelike pitch in a surface of the filter, and filter resistance in the exemplary embodiment.

FIG. 6 is a diagram showing one example of the correspondence between the size of the intake opening 127 according to the exemplary embodiment, the saw-toothed or wavelike pitch in the surface of the filters 122 and 142, and the airflow resistance (filter resistance) in the filters 122 and 142. The inventor set various values for the width N and the height M of the intake opening 127 with virtually constant area, and set various values for the saw-toothed or wavelike pitch in the surface of the filters 122 and 142, caused air to flow in from the intake opening 127 and analyzed the filter resistance of the filters 122 and 142. In this analysis, the flow volume of air flowing into the intake opening 127 was 7.3 (m3/min).

With this analysis, as shown in FIG. 6, in a model D (the width N of the intake opening 127 being 367.5 (mm), the height M being 19.0 (mm) and the saw-toothed or wavelike pitch in the surface of the filters 122 and 142 being 4.5 (mm)), the filter resistance was 203 (Pa). In addition, in a model E (the width N of the intake opening 127 being 285.9 (mm), the height M being 24.4 (mm) and the saw-toothed or wavelike pitch in the surface of the filters 122 and 142 being 3.5 (mm)), the filter resistance was 229 (Pa). In addition, in a model F (the width N of the intake opening 127 being 204.0 (mm), the height M being 34.2 (mm) and the saw-toothed or wavelike pitch in the surface of the filters 122 and 142 being 2.5 (mm)), the filter resistance was 269 (Pa).

From the results of the above-described analysis, the resistance of the filters 122 and 142 is in a suitable range for any of the models D, E and F. That is to say, by making the saw-toothed or wavelike pitch in the surface of the filters 122 and 142 be larger the smaller the height M of the intake opening 127 is, the resistance of the filters 122 and 142 is kept in a suitable range.

Figure 7:
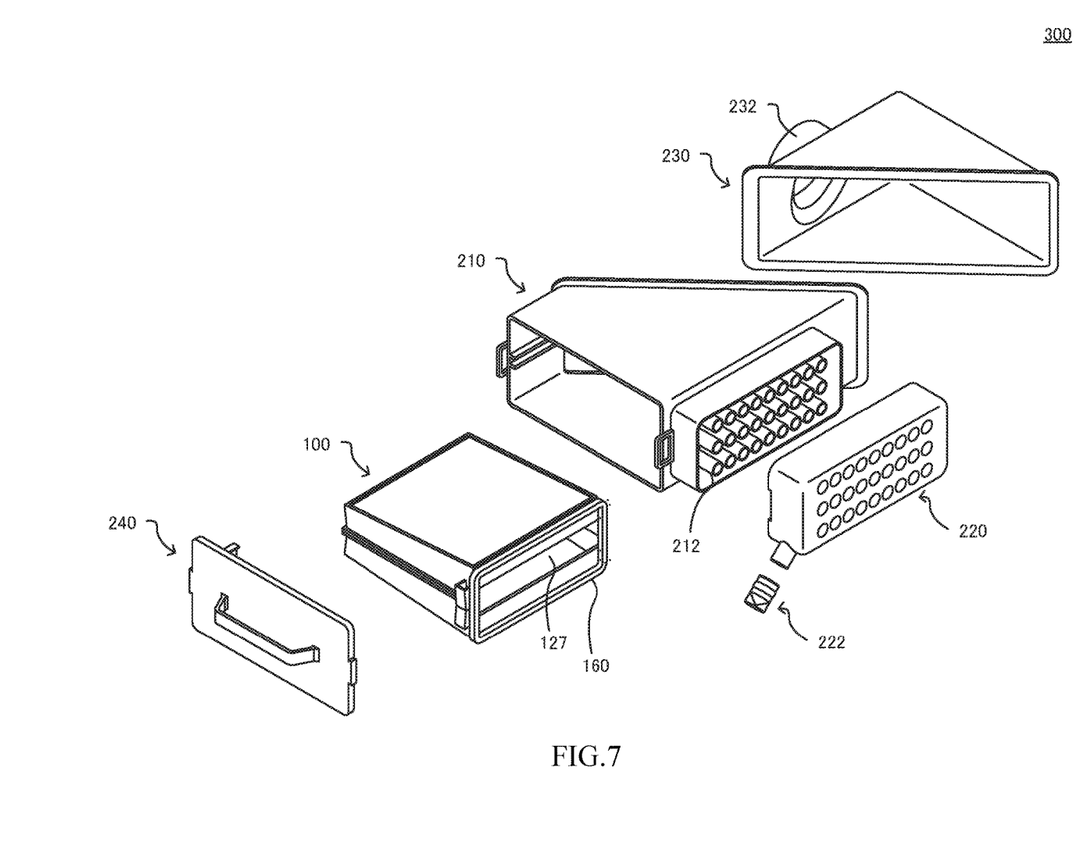
FIG. 7 is an external oblique view of components comprising an air cleaner unit according to the exemplary embodiment.
Figure 8:
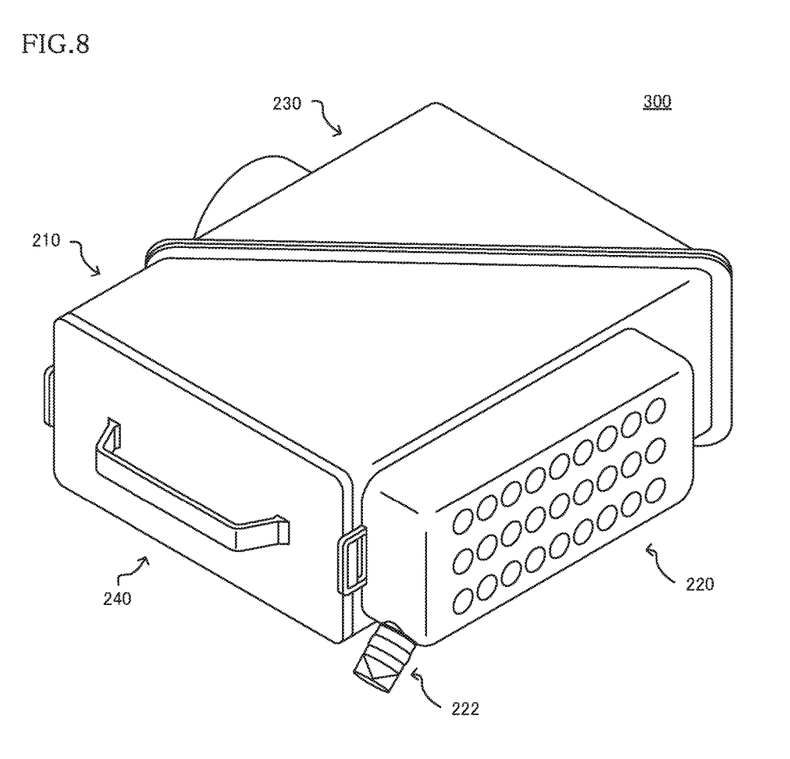
FIG. 8 is an external oblique view of the air cleaner unit according to the exemplary embodiment.

FIG. 7 is an external oblique view of components comprising an air cleaner unit 300 according to the exemplary embodiment, and FIG. 8 is an external oblique view of the air cleaner unit 300 according to the exemplary embodiment.

As shown in FIG. 7, the air cleaner unit 300 includes the air cleaner 100, an intake opening side case 210, an intake opening unit 220, a valve 222, an outflow opening side case 230 and a lid 240.

A fitting 212 is provided on the intake opening side case 210, and the intake opening unit 220 is mounted on the fitting 212. In addition, the valve 222 is provided on the intake opening unit 220. Furthermore, an exhaust opening 232 is provided in the outflow opening side case 230.

The air cleaner 100 is housed in the intake opening side case 210 and the outflow opening side case 230. At this time, the air cleaner 100 is positioned with the side on which the intake opening 127 is formed on the side of the fitting 212 of the intake opening side case 210, and the gasket 160 is adhered to the fitting 212. In addition, the air cleaner 100 is positioned such that the side opposite the side in which the intake opening 127 is formed is on the side of the exhaust opening 232 of the outflow opening side case 230.

Furthermore, in the intake opening side case 210, the lid 240 is mounted on the side opposite the side of the outflow opening side case 230. Through this, the air cleaner unit 300 is comprised as shown in FIG. 8. A worker can remove and exchange and/or the like the air cleaner 100 housed in the unit by opening the lid 240.

As described above, in the air cleaner 100 according to this exemplary embodiment, the case 120 is positioned so as to be above the filter 122 and the case 140 is positioned so as to be below the filter 142, and the notch 126 in the case 120 and the notch 146 in the case 140 are positioned so as to face each other. In addition, the protuberance 128 of the squared-U-shaped frame 125 in the case 120 and the protuberance 148 of the squared-U-shaped frame 145 in the case 140 touch each other, and the case 120 and the case 140 are jointed together through a method such as vibration welding and/or the like. The gasket 160 is positioned at a position in contact with the end of the protuberance 128 and the end of the protuberance 148 and is joined the flank 124a in the case 120 and the flank 144a in the case 140.

Furthermore, by making the ratio of the depth L of the cases 120 and 140 to the height M of the intake opening 127 be in the range of 10:1 to 20:1, having the filter resistance in the suitable range becomes possible. More specifically, in a case in which the depth L of the cases 120 and 140 is restricted in order to make the air cleaner 100 more compact, by making the height M of the intake opening 127 be in the range of 1/10 to 1/20 of the depth L of the cases 120 and 140, a structure can be realized in which the filter resistance does not become excessively large.

In addition, in a case in which the surface area of the intake opening 127 is restricted in order to achieve compactness, by making the saw-toothed or wavelike pitch in the surface of the filters 122 and 142 become larger the smaller the height M of the intake opening 127 is, achieving a filter resistance in the suitable range becomes possible.

In addition, the gasket 160 is positioned at a position in contact with the end of the protuberance 128 and the end of the protuberance 148 that have become integrated through vibration welding and is adhered to the end of the protuberance 128 and the end of the protuberance 148, and through this air taken into the air cleaner 100 from the intake opening 127 is prevented from leaking to the outside from around the end of the protuberance 128 and the end of the protuberance 148, and can only flow to the outside from the filter 122 and the filter 142. That is to say, the airtightness inside the air cleaner 100 improves, so the degree of cleaning of the air can be increased.

In addition, by making the gasket 160 ring-shaped, a single gasket 160 can be positioned at a position in contact with the end of the protuberance 128 and the end of the protuberance 148 in both the X and Y sections of FIG. 2, so simplifying manufacturing procedures becomes possible.

In addition, the case 120 and the case 140 have the same shape, so reducing cost and simplifying manufacturing procedures becomes possible because preparing respective molds for each is not necessary.

Although the exemplary embodiment was described above, the present disclosure is not limited to the above-described exemplary embodiment.

For example, the gasket 160 is not limited to a rubber member but may be a foam material such as a sponge and/or the like, for example. In addition, the gasket 160 may interlock with the end of the protuberance 128 and the end of the protuberance 148, and may be adhered thereto by an adhesive. In addition, the gasket 160 is not limited to a ring-shaped member, and for example may be such that a ring-shaped member is formed by joining together the ends of a string-shaped member. In addition, in place of the gasket 160, a member may be used that is positioned at a position in contact with the end of the protuberance 128 and the end of the protuberance 148 and that is sealed to end of the protuberance 128 and the end of the protuberance 148.

In addition, the case 120 and the case 140 need not have the same shape, and for example, the shapes of the case 120 and the case 140 may differ and one may interlock with the other.

Various embodiments and variations of the present disclosure are possible without deviating from the scope or broader application thereof. The above-described exemplary embodiment is for describing the present disclosure and does not limit the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An air cleaner comprising a first box-shaped member and a second box-shaped member, and a joining member for joining the first box-shaped member and the second box-shaped member, wherein:
   the first box-shaped member comprises:
      a rectangular first filter;
      four first flanks joined to and rising over outer edges of the first filter; and
      a first notch formed in one first flank; and
   the second box-shaped member comprises:
      a rectangular second filter;
      four second flanks joined to and rising over outer edges of the second filter; and
      a second notch formed in one second flank;
   the first box-shaped member and the second box-shaped member are joined such that the first notch and the second notch face each other and form an air intake opening for the air cleaner, with the rectangle first filter and the rectangular second filter spaced apart from each other, whereby air received in the air intake opening is filtered by the rectangular first filter or the rectangular second filter.

2. The air cleaner according to claim 1, wherein:
   in two first flanks joined to the first flank in which the first notch is formed, out of the first flanks, the side joined to the first flank in which the first notch is formed is greater than the side opposite the side joined to the first flank in which the first notch is formed; and
   in two second flanks joined to the second flank in which the second notch is formed, out of the second flanks, the side joined to the second flank in which the second notch is formed is greater than the side opposite the side joined to the second flank in which the second notch is formed;
   whereby a distance between the rectangular first filter and the rectangular second filter at the air intake opening is greater than a distance between the rectangular first filter and the rectangular second filter opposite the air intake opening.

3. The air cleaner according to claim 1, wherein by the first box-shaped member and the second box-shaped member being joined together, the ratio of the height of an intake opening formed by the first notch and the second notch to the length from a surface in which the intake opening is formed in the first box-shaped member and the second box-shaped member to a surface opposite the surface in which the intake opening is formed is in the range of 1:10 to 1:20.

4. The air cleaner according to claim 3, wherein:
   the first filter and the second filter have a saw-toothed or wavelike surface; and
   the pitch of the saw-toothed or wavelike surface is larger the smaller the height of the intake opening is.

* * * * *